Feb. 25, 1930.  G. R. HAUB  1,748,550
METHOD AND APPARATUS FOR SEVERING MOLTEN GLASS
Filed July 29, 1927  2 Sheets-Sheet 1
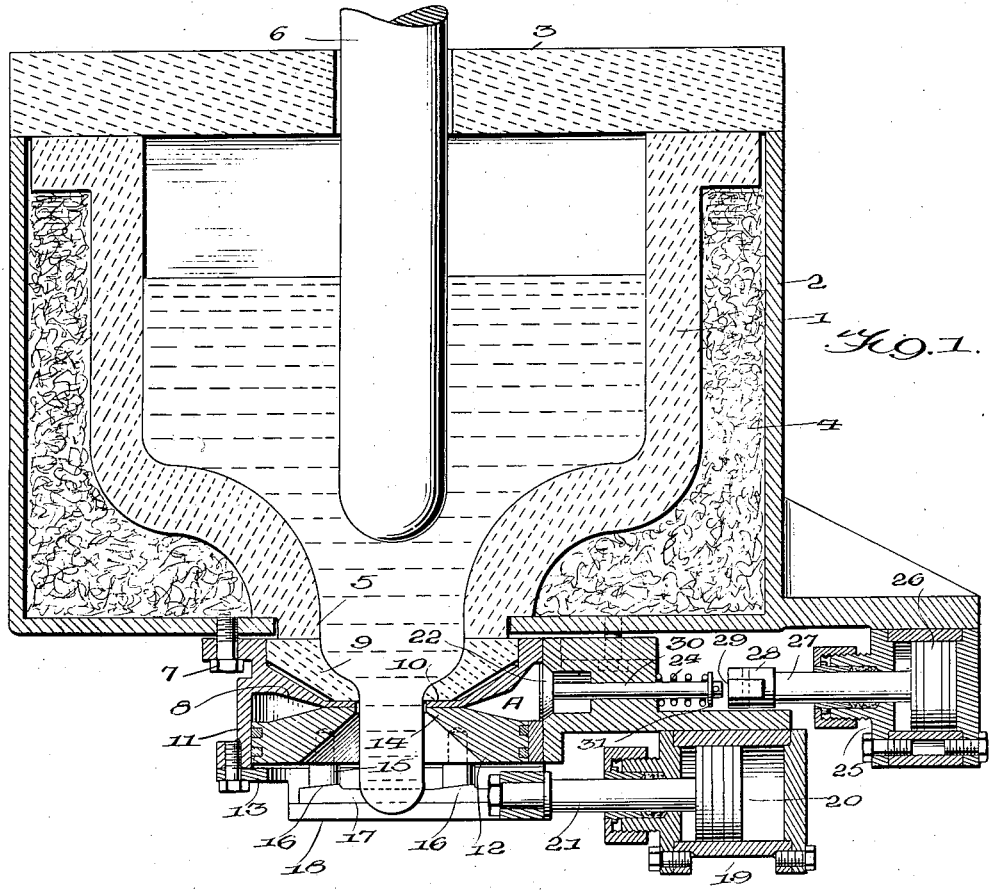
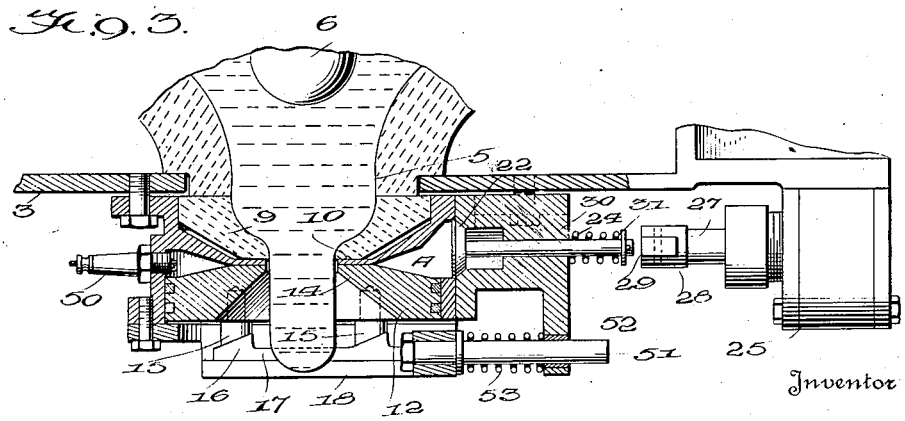
Inventor
Geo. R. Haub,
By Eccleston & Eccleston
Attorneys

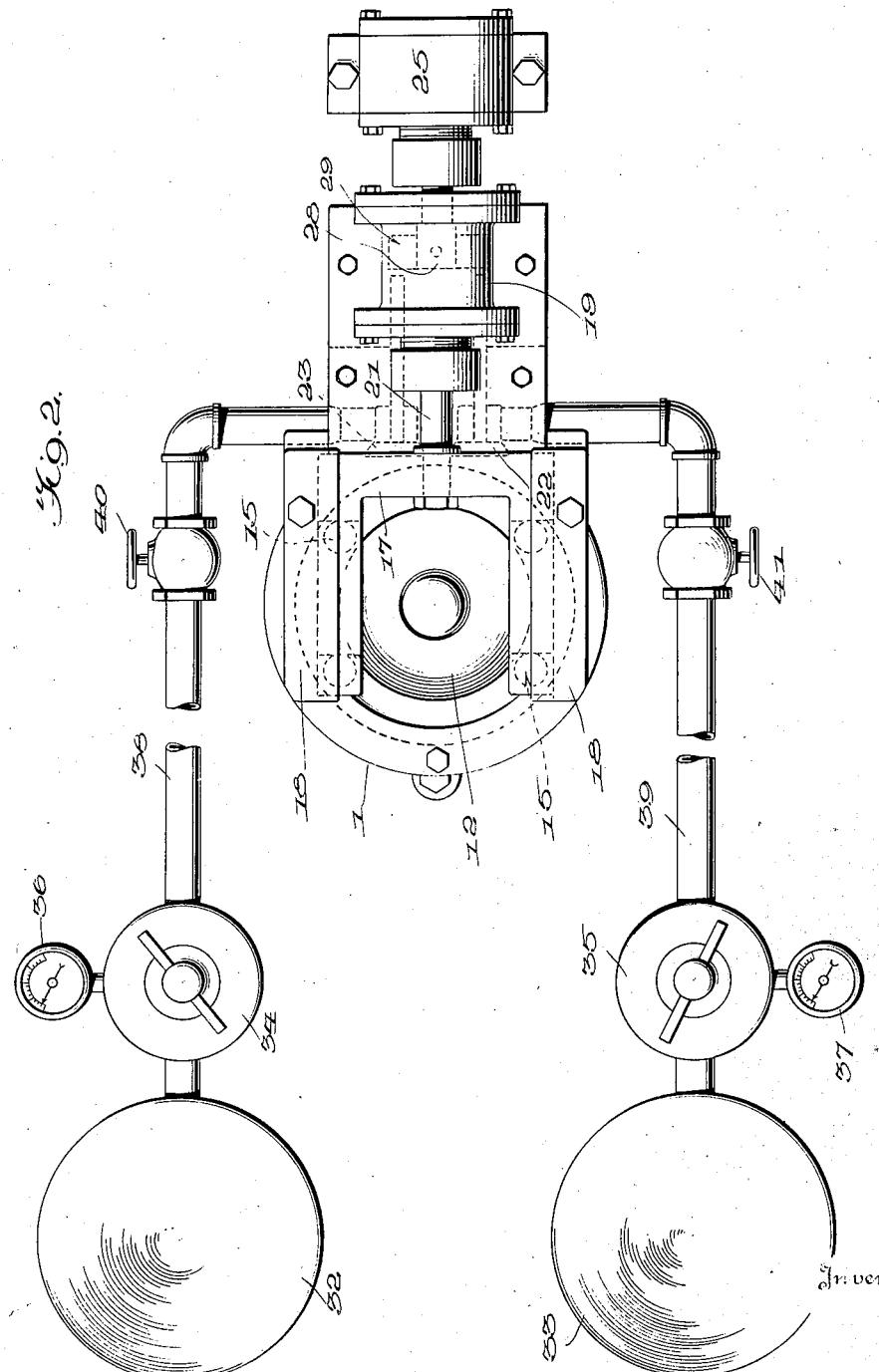

Patented Feb. 25, 1930

1,748,550

UNITED STATES PATENT OFFICE

GEORGE R. HAUB, OF WASHINGTON, PENNSYLVANIA, ASSIGNOR TO HAZEL-ATLAS GLASS CO., OF WHEELING, WEST VIRGINIA, A CORPORATION OF WEST VIRGINIA

METHOD AND APPARATUS FOR SEVERING MOLTEN GLASS

Application filed July 29, 1927. Serial No. 209,345.

In the severing of molten glass to form mold charges, the universal practice has been to employ shears. While the use of shears has been largely satisfactory, yet it has one very objectionable feature, in that it usually results in the formation of "shear marks" in the finished article. It is well known, of course, that this is due to the glass becoming chilled by contact with the metal shears. Not only is the upper end of the severed gob thus chilled, but also the lower end of the remaining stub.

Great effort has been made to eliminate the shear marks, and to some extent this has been accomplished by "necking-in" the glass, thereby reducing the cross-sectional area of the glass through which the shears must pass. But this has not eliminated the shear marks, it has merely reduced the effect thereof. The glass is still chilled, but the extent of chilling has been reduced. In order that shear marks may be wholly eliminated it is necessary to eliminate the shears, for so long as relatively cold metal comes into contact with molten glass, the chilling effect thereof is bound to be more or less apparent in the finished articles.

I am aware that many attempts have been made to avoid the use of shears by employing a flame or compressed air. But so far as I know all of these attempts have failed, for reasons well known to those skilled in the glass art.

For example, the various attempts to cut off a gob by compressed air have failed for the reason that when air is blown onto the hot glass it quickly chills the glass and forms a skin on it at the point where the cut is being attempted, thereby causing the glass to hold together and successfully resist the cutting action. In other words the viscosity of the glass rapidly increases with a decrease in temperature, and, of course, the viscosity increase makes the severing more difficult. The efforts to cut molten glass by means of a flame have also failed. In these attempts a steady, short, sharp flame was employed, to melt the glass within a very small area, so that the weight of the glass which is below it will pull it off, the flame assisting the glass as it lets go. This was supposed to be accomplished by raising the temperature above the ordinary temperature of a glass charge, so that the glass would act as an ordinary liquid having no viscosity or ability to hold together. This has been a failure because it has been impossible to attain a temperature of sufficient intensity, in such a small area that it would cut a gob quick enough to be successful. Obviously the severing must be substantially instantaneous, or there will be glass strings and various other objectionable features which would make it wholly impracticable.

In the present invention an explosive mixture is employed for severing the glass. The detonation of the explosive mixture of gas and air, or other mixture, gives a stream of the products of combustion and unburned gases much stronger than that obtainable by ordinary mechanical means. Then too, the detonation raises the temperature of the gases above the softening point of the glass, so that the glass is cut by the onrushing knife of gas; the heat also assists in severing the glass by locally cutting down the tenacity and viscosity of the gob as it leaves the flow orifice bushing. Also considerable benefit is obtained by the fact that the gob is cut, not at a distance from the bushing, but preferably right from the bottom face of it where the glass is coming from the flow spout still hot and without any chilled skin on its surface.

To sever molten glass by flame or the like, there are five essentials; the flame or fluid must be intermittently applied as distinguished from continuous flames; the severing must be substantially instantaneous; the severing flame or fluid must be extremely thin or knife like; the severing flame or fluid must be at a very high temperature; and the severing flame or fluid must be under great pressure. As far as I know these essentials have never been present in any device heretofore devised for severing glass by flame or the like. All of these essentials are produced in the present device by merely igniting an explosive mixture at the instant the glass is to be severed, thereby producing a knife-like sheet of flame at high temperature and under high pressure.

The invention will be better understood from the following detailed description, when taken in connection with the accompanying drawings; but it is to be noted that the invention is in no manner limited to the particular mechanism shown herein.

In the drawings:

Figure 1 is a vertical section through a conventional form of flow spout and showing the novel shearing means in place thereon.

Figure 2 is a bottom plan view of the device as shown in Figure 1; and

Figure 3 is a fragmentary sectional view of a modified construction.

Referring to the drawings in more detail, numeral 1 designates the conventional type of flow spout of refractory material and having the ordinary metal casing 2, refractory cover 3, and a packing of heat insulating material 4 disposed between the metal casing and the flow spout. The flow spout is also provided with the usual flow orifice 5 through which the molten glass is fed to the molds.

Numeral 6 indicates a plug in alignment with the flow orifice and serving to regulate the flow of glass through the orifice 5. The plug may be stationary but vertically adjustable with respect to the orifice or outlet 5, or the plug may be vertically reciprocated in the well known manner, or a pneumatic control may be substituted for the plug. In other words, the present method of severing is adaptable to any feeder; and as no scar is formed by this method of severing it is not as important to neck-in the glass, as in the prior practice.

Bolted to the bottom of the casing 2 of the flow spout as by means of bolts 7 is the upper wall 8 of the explosion chamber. This wall 8 also serves as a support for the bushing 9 and it will be apparent that the bushing may be easily removed for renewal or for the substitution of a bushing of different size by merely removing the wall 8 and the parts hereinafter described which are attached thereto. The wall 8 is of annular shape so as to encircle the flow orifice and is provided with an inwardly-directed, horizontally-disposed flange or extension 10 which serves as a guide for the explosive fluid as will be later described.

A cylindrical wall 11 is also formed on the wall 8 and in effect constitutes a cylinder, in which is located the bottom wall 12. This bottom wall 12 is really a piston, but is in the form of an annulus to permit the glass to flow therethrough. The outer edge of the wall or piston 12 is provided with packing or piston rings 13 which serve to provide a gastight contact between this wall and the inner surface of the cylinder. The piston is adapted to have a slight vertical movement in the cylinder 11 and is provided with an inwardly-directed, horizontally disposed flange or extension 14 which also serves as a guide for the explosive fluid and which is normally held in contact with the guide flange 10 by a mechanism to be now described. As will appear from an inspection of the drawings, the bushing 9 extends inwardly slightly beyond the inner periphery of the horizontal flanges 10 and 14. This is the preferable construction, but obviously it is not essential.

Secured to the under face of the wall 12 are four wedge members 15 although this number may be varied as desired, and coacting with these members is an equal number of wedges 16 formed on the upper surface of a substantially U-shaped member 17. This member is slidably mounted on the guideways 18, and may be reciprocated by any means desired although in the present instance I have disclosed for this purpose an air cylinder 19 provided with a piston 20 and piston rod 21 rigidly connected with the member 17. The pipe connections for this cylinder are not shown but it is to be understood that they are of usual form and connected up with the main air lines and timing valves so as to properly synchronize this element with the other parts of the feeder, forming machine, etc.

Obviously, as the piston 20 is moved to the right (Fig. 1), the pressure of the wedges 16 against the wedges 15 is removed to a greater or less extent, depending upon the amount of movement of the piston 20, and the wall 12 is free to move downwardly thereby creating an annular space between the guide flanges 10 and 14 and permitting the escape of the explosive fluid within the explosion chamber "A" in a thin sheet and directing it into contact with the molten glass protruding through the outlet 5. It is to be understood that the flanges 10 and 14 are normally forced tightly together so as to prevent the escape of the explosive mixture and that the extent of movement of the lower flange 14 may be varied so as to obtain a sheet or jet of explosive fluid of the desired thickness.

Associated with the explosion chamber "A" is a pair of valves 22 and 23 which control the admission of oxygen and acetylene to the explosion chamber. Other gases, of course, may be employed, and instead of providing two valves it may be found desirable to employ a single valve and mix the gases prior to their entrance into the explosion chamber. In the embodiment shown, the valves 22 and 23 are normally held in closed position by means of coil springs 24, which are seated on washers 31. For opening the valves an air cylinder 25 is permanently mounted on the bottom of the casing 3, and is provided with a piston 26 and piston rod 27. Pinned to the outer end or head 28 of the piston rod 27 is a cross-bar 29, to engage the ends of the valve stems 30 and move the valves to open position. The valves will be closed by the springs 24, when the piston rod 27 is moved in the opposite direction to release the valve stems.

Referring to Figure 2, the numerals 32 and 33 indicate storage tanks for the gases employed in the severing operation, while the numerals 34 and 35 designate pressure regulators provided with gauges 36 and 37. Pipes or mains 38 and 39 lead from the pressure regulators to the mechanically-operated valves 22 and 23, and manually-operated valves 40 and 41 may be provided for regulating the volume of the gases or for shutting off these mains when desired. The cylinder 25 for operating the valves 22 and 23 is connected up with the main air lines and is associated with the usual timing device whereby the operation of the valves is synchronized with movement of the wedge member 17 as well as with the forming machine, etc.

In the operation of the severing means as disclosed in Figs. 1 and 2, the forming machine, etc., are set in operation in the usual manner, and the pressure and volume of the explosive gases regulated by the means described, to suit the prevailing conditions of the molten glass, such as the temperature of the glass, the cross-sectional area of the glass to be severed, and other varying conditions. The valves 22—23 having been opened in the manner described, by piston 27 and bar 29, gas is admitted into chamber "A" and the valves then closed by springs 24, the bar 29 having been withdrawn to inoperative position. Piston 20 is now moved to the right (Fig. 1), thereby moving wedges 16 to the right to relieve pressure on the wedges 15. Gas pressure in chamber "A" will then produce a slight downward movement of the bottom wall 12 of the explosion chamber, the wall 12 being in effect a piston operating within the cylindrical wall 11. Of course, the extent of downward movement will be extremely slight, and if desired, any suitable means may be employed to vary the extent of such movement, by adjusting the outer limit of movement of piston 20.

As the wall 12 moves downwardly an annular passage is provided between the guide flanges 10 and 14 and a thin knife-like sheet of the explosive mixture is forced therethrough into contact with the molten glass projecting downwardly through the outlet. Contact of the gases with the glass will cause immediate explosion of the gases in the chamber "A" thereby forcing a thin sheet of the products of combustion through the column of glass and severing that portion of the glass below the flanges 10—14 from the main body of glass. The thin sheet of gas flames projected between the flanges 10—14 is at an extremely high temperature and pressure and consequently will make a clean and practically instantaneous cut through the molten glass and permit its descent into the mold then under the flow orifice. The severing action is also helped to a considerable extent by reason of the fact that the glass is severed practically at the lower face of the bushing; but, of course, the invention is not limited to severing at that point. It should be here noted that this method of severing the molten glass not only eliminates shear marks in the finished ware by avoiding the chilling of the top of the severed gob, but also by avoiding the chilling of the end of the remaining stub.

After the charge of glass has been severed as described the piston 20 is moved to the left (Fig. 1) in the periodic operation of the mechanism thereby raising the wall or piston 12 and bringing the flanges 10—14 into gas-tight engagement; after which the entire operation is repeated periodically at the desired speed.

It is needless to say that the operation of the forming machine, the feeding of the glass, and the operation of the cylinders 19 and 25, are all in the desired timed relation.

In the modified form of the invention shown in Figure 3 the explosive gases are ignited by an electric spark such as is common in the operation of gasoline engines. The modified form employs the identical form of combustion chamber heretofore described and differs from the first form in that no positive means is required in operating the wedge member 17 to release the piston or bottom wall 12 of the combustion chamber.

The spark plug is indicated in the form of the invention shown in Figure 3 by the reference numeral 50 and is preferably associated with a timer (not shown) to cause the spark to jump across the plug terminals at the proper intervals and in synchronization with the other elements of the mechanism. In lieu of the piston rod 21 for operating the wedge member 17 I provide a guide rod 51 which is slidably mounted in a bracket 52 depending from the body of the mechanism. A coil spring 53 encircles the rod and normally forces it to the left (Fig. 3) so as to cause the wedges 16 to coact with the wedges 15 to force the piston 12 to the upper limit of its vertical movement. Obviously, in this form of the invention it is not necessary that the wall 12 be moved downwardly prior to the explosion of the gases since contact of the gases with the molten glass is not relied upon in causing the explosion. On the contrary, the explosion which is caused by the spark plug 50 will, through its own explosive force, force the wall 12 downwardly, at the same time causing the wedge member 17 to move to the right against the pressure of spring 53. The thickness of the sheet of flame projected through and across the column of glass will, of course, depend upon the extent of movement of the bottom member and this may be varied by regulating the compression on spring 53 or by substituting a stronger spring. Also, any positive and adjustable means may be employed for positively limiting the downward movement. After the explosion of the gases the spring 53 will return member 17 to its normal position thus forcing the wall 12 upwardly so that its flange 14 is in sealing contact with the flanges 10.

In both forms of the invention it should be noted that the cylinder 25 and related parts for operating the valves 22 and 23 are entirely separate from the explosion chamber, outlet bushing, etc., and that it is a comparatively simple matter to change bushings from time to time as desired, since it is only necessary to remove the several bolts by means of which the upper plate 8 of the combustion chamber is secured to the bottom of the flow spout.

From the foregoing description it will be apparent that I have devised a practical method and apparatus for severing glass without the necessity of bringing shears or other metallic severing devices into contact with the glass; and thereby wholly eliminating the objectionable shear marks. Of course, I am aware that numerous attempts have been made to sever glass by flame, etc., but so far as I know such attempts have always failed; for reasons well known to those skilled in the glass art. The present device operates on an entirely different principle from anything heretofore suggested, and by reason of the intermittent application of a knife-like sheet of flame at extremely high pressure and temperature, I am able to sever the glass cleanly and instantaneously, without producing shear marks, and without any objectionable features.

While I have shown and described a specific form of apparatus, it is to be understood that this is merely for illustrative purposes, and that the invention relates broadly to a method and means of severing molten glass by an explosive mixture, and accordingly the claims are not to be limited to any specific mechanism.

What I claim is:

1. In a glass feeder, a flow spout having an outlet, and means for radially directing a thin annular sheet of an explosive mixture prior to ingition. into contact with the glass, across the face of said outlet, said means being operated periodically.

2. In a glass feeder, a flow spout having an outlet, an annular chamber for an explosive fluid adjacent said outlet, and means for radially directing said fluid in a thin sheet prior to ignition, into contact with the glass, across the face of said outlet, said means being operated periodically.

3. In a glass feeder, a flow spout having an outlet, a chamber for an explosive fluid adjacent said outlet, said chamber provided with a movable wall to permit the exit of said fluid from the chamber and across the face of the outlet.

4. In a glass feeder, a flow spout having an outlet, an annular chamber for an explosive fluid adjacent said outlet, said chamber comprising a fixed and a movable member, said members being so shaped as to direct the explosive fluid across the face of the outlet when the movable member is moved away from the fixed member.

5. In a glass feeder, a flow spout having an outlet, an annular chamber for an explosive fluid adjacent said outlet, means for radially directing said fluid in a thin sheet, into contact with the glass, across the face of said outlet, valves for admitting a gas and air to said chamber to form an explosive fluid and means for intermittently operating said valves.

6. In a glass feeder, a flow spout having an outlet, a chamber for an explosive fluid adjacent said outlet, means for directing said fluid in a thin sheet across the face of said outlet, a spring-pressed valve for admitting fluid to said chamber and a cylinder and piston for intermittently operating said valve.

7. In a glass feeder, a flow spout having an outlet, a chamber for an explosive fluid adjacent said outlet, intermittently operated means for admitting an explosive fluid to said chamber, and means synchronized with said first-mentioned means for permitting the discharge of said fluid across the face of the outlet.

8. In a glass feeder, a flow spout having an outlet, a chamber for an explosive fluid adjacent said outlet, said chamber including relatively movable walls, intermittently operated means for admitting an explosive fluid to said chamber, and means synchronized with said first-mentioned means for moving said walls relatively to permit the discharge of said fluid from the chamber.

9. In a glass feeder, a flow spout having an outlet, a chamber for an explosive fluid adjacent said outlet, intermittently operated means for admitting an explosive fluid to said chamber, means synchronized with said first-mentioned means for permitting the discharge of said fluid from the chamber, and guiding means for directing the fluid in a thin sheet against the glass protruding from the outlet.

10. In a glass feeder, a flow spout having an outlet, a chamber for an explosive fluid surrounding said outlet, said chamber including a movable wall adapted to open the chamber to permit the escape of the fluid, and means normally holding said wall in closed position.

11. In a glass feeder, a flow spout having an outlet, a chamber for an explosive fluid surrounding said outlet, said chamber including a movable wall adapted to open the chamber to permit the escape of the fluid, a wedge member normally holding said wall in closed position, and means for operating said wedge member.

12. In a glass feeder, a flow spout having an outlet, a chamber for an explosive fluid surrounding said outlet, including a movable lower wall adapted to open the chamber to permit the escape of the fluid, wedge members normally holding said wall in closed position, and a cylinder and piston for periodically reciprocating said wedge members to open and close said chamber.

13. In a glass feeder, a flow spout having an outlet, a chamber for an explosive fluid surrounding said outlet, including a movable lower wall adapted to open the chamber to permit the escape of the fluid, wedge members normally holding said wall in closed position, a cylinder and piston for periodically reciprocating said wedge members to open and close said chamber, and means synchronized with said cylinder and piston for admitting an explosive fluid to said chamber.

14. In a glass feeder, a flow spout having an outlet, a chamber for an explosive fluid surrounding said outlet, said chamber comprising an annular upper wall, a cylindrical side wall, and an annular lower wall reciprocably mounted within said cylindrical side wall.

15. In a glass feeder, a flow spout having an outlet, a chamber for an explosive fluid surrounding said outlet, said chamber comprising an annular upper wall, a cylindrical side wall, an annular lower wall reciprocably mounted within said cylindrical wall and having gas-tight engagement therewith, and means normally holding said lower wall at the upper limit of its movement.

16. In a glass feeder, a flow spout having an outlet, a chamber for an explosive fluid surrounding said outlet, said chamber comprising an annular upper wall, an inwardly directed extension on said wall, a cylindrical side wall, an annular lower wall reciprocably mounted within said cylindrical wall, an inwardly directed extension on said lower wall, and means normally holding said lower wall at the upper limit of its movement with its extension in engagement with the extension on the upper wall.

17. In a glass feeder, a flow spout having an outlet, a chamber for an explosive fluid surrounding said outlet, said chamber comprising an annular upper wall, an inwardly-directed, horizontally-disposed guide flange on said wall, a cylindrical side wall, an annular lower wall reciprocably mounted within said cylindrical wall and having gas-tight engagement therewith, an inwardly-directed, horizontally-disposed guide flange on said lower wall, and means normally holding said lower wall at the upper limit of its movement with its guide flanges in sealing engagement with the guide flange on the upper wall.

18. In a glass feeder, a flow spout having an outlet, a chamber for an explosive fluid surrounding said outlet, said chamber comprising an annular upper wall, a cylindrical side wall, an annular lower wall reciprocably mounted within said cylindrical wall and having gas-tight engagement therewith, means normally holding said lower wall at the upper limit of its movement, means periodically releasing the lower wall, and means synchronized therewith for admitting an explosive fluid to the chamber.

19. In a glass feeder, a flow spout having an outlet, a chamber for an explosive fluid surrounding said outlet, said chamber comprising an annular upper wall, a cylindrical side wall, an annular lower wall reciprocably mounted within said cylindrical wall and having gas-tight engagement therewith, means normally holding said lower wall at the upper limit of its movement, means for periodically admitting an explosive fluid to said chamber, and means synchronized therewith for releasing the lower wall and for returning it to its normal position.

20. The method of severing charges of molten glass which includes flowing the glass through an outlet, and intermittently directing a thin stream of explosive gases radially against the surface of the glass, thereby igniting the gas and severing the glass.

GEORGE R. HAUB.